(12) United States Patent
Roest et al.

(10) Patent No.: US 6,686,689 B2
(45) Date of Patent: Feb. 3, 2004

(54) IMAGE DISPLAY DEVICE

(75) Inventors: Wouter Roest, Eindhoven (NL); Helmar Van Santen, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 220 days.

(21) Appl. No.: 09/854,382

(22) Filed: May 11, 2001

(65) Prior Publication Data

US 2002/0014829 A1 Feb. 7, 2002

(30) Foreign Application Priority Data

May 15, 2000 (EP) .............................. 00201718

(51) Int. Cl.$^7$ ................................. H01J 1/62
(52) U.S. Cl. ....................... 313/495; 313/497
(58) Field of Search .................. 313/495, 422, 313/497, 444, 359.1, 360.1; 359/487, 495, 630, 627, 301, 483

(56) References Cited

U.S. PATENT DOCUMENTS 4,486,070 A * 12/1984 Benton .................. 350/277
5,982,540 A * 11/1999 Koike et al. ............. 359/487

* cited by examiner

Primary Examiner—Nimeshkumar D. Patel
Assistant Examiner—Ken A Berck
(74) Attorney, Agent, or Firm—Gregory L. Thorne

(57) ABSTRACT

An image display device comprising a light modulation panel, an illumination device arranged opposite the light modulation panel and a light source connected to the illumination device. The illumination device comprises at least one separating layer which has at least one flat surface extending parallel to the light modulation panel and a serrated surface situated on a side which faces away from the flat surface. Said serrated surface includes a number of sawtooth-shaped, juxtaposed projections which are each bounded by a first and a second separating surface, the first separating surface enclosing an acute interior angle with the flat surface and the second separating surface enclosing an obtuse interior angle with the flat surface.

17 Claims, 4 Drawing Sheets

IMAGE DISPLAY DEVICE

Figure 1:
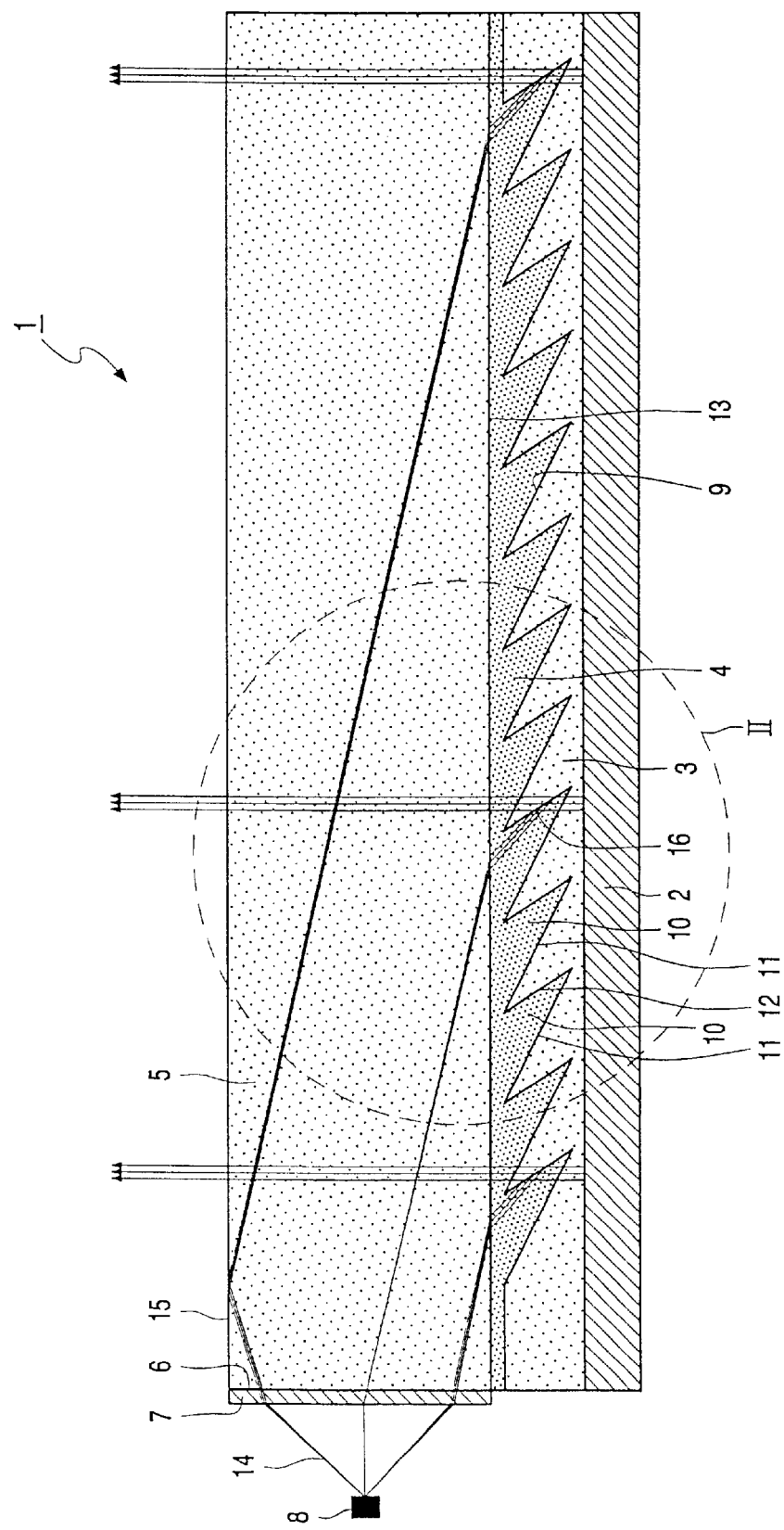

The invention relates to an image display device comprising a light modulation panel, an illumination device facing the light modulation panel and a light source coupled to the illumination device, said illumination device comprising at least one separating layer which has at least one flat surface extending parallel to the light modulation panel and a serrated surface situated on a side remote from the flat surface, said serrated surface having a plurality of sawtooth-shaped, juxtaposed projections which are each bounded by a first and a second separating surface.

An image display device of this type is used in, for example, head-mounted displays (HMDs) and projection televisions. LCDs which are either transmissive or reflective are regularly used as light modulation panels. In a reflective LCD, the LCD is illuminated from the same side as the side from which it is viewed. In transmissive LCDs, the LCD is illuminated from a different side than that from which it is viewed. Notably for HMDs, the light source and the associated illumination device should be as thin as possible so that the HMD can be given a relatively compact form. Reflective LCDs are preferably used in HMDs. If the illumination device is relatively thin, it has the additional advantage that a lens situated on a side of the illumination device remote from the light modulation panel can be arranged relatively close to the illumination device, which is favorable for achieving an optimal magnification.

In such an image display device known from European patent application EP-A1-0 948 755, the illumination device comprises two layers connected to each other by means of a serrated surface. One layer has a single refractive index and the other layer has two refractive indices, one of which corresponds to the refractive index of the first layer. The first and second separating surfaces of the serrated projections both enclose acute interior angles with the flat surface of the separating layer.

In this patent application, an interior angle is understood to be an angle between a separating surface and the flat surface of the separating layer, measured by the material of the separating layer. An obtuse angle is herein understood to mean any angle which is larger than 90°, whereas an acute angle is understood to mean any angle which is smaller than 90°.

The unpolarized light coming from the light source is coupled into both layers, while one refractive index applies to one direction of polarization and the other refractive index applies to the other direction of polarization. In combination with the choice of both acute interior angles, the known illumination device ensures that only light having a desired direction of polarization is deflected to the light modulation panel. The light modulated by the light modulation panel is subsequently passed through the illumination device. Then, the modulated light beam is refracted.

It is an object of the invention to provide an image display device comprising a relatively compact illumination device.

In the image display device according to the invention, this object is achieved in that the first separating surface encloses an acute interior angle with the flat surface, whereas the second separating surface encloses an obtuse interior angle with the flat surface. Since the second separating surface encloses an obtuse interior angle with the flat surface, each projection will extend partly beyond a juxtaposed projection.

A light beam from the light source is reflected on the second separating surface in the direction of the light modulation panel. By choosing the obtuse interior angle, substantially any desired deflection of the light beam can be realized. In transmissive light modulation panels, the light beam is subsequently passed further on a side remote from the separating layer.

For use in reflective light modulation panels, use is to be made of a separating layer having a first and a second refractive index, in which the first refractive index applies at least to the separating layer for the light beam coming from the light source and the second refractive index applies to the light beam modulated by the light modulation panel. A light beam from the light source is reflected on the second separating surface with the first refractive index in the direction of the light modulation panel. Subsequently, the light beam is modulated by the light modulation panel and its direction of polarization is reversed. The light beam is subsequently again reflected in the direction of the separating layer, with the second refractive index applying to the light beam modulated by the light modulation panel. By choosing the obtuse interior angle and the two refractive indices, substantially any desired deflection of the light beam can be realized.

If the illumination device is provided between the separating layer and the light modulation panel with an optical element also having the second refractive index, the light beam modulated by the light modulation panel will no longer be deflected on the separating surfaces.

These and other aspects of the invention are apparent from and will be elucidated with reference to the embodiments described hereinafter.

Figure 2:
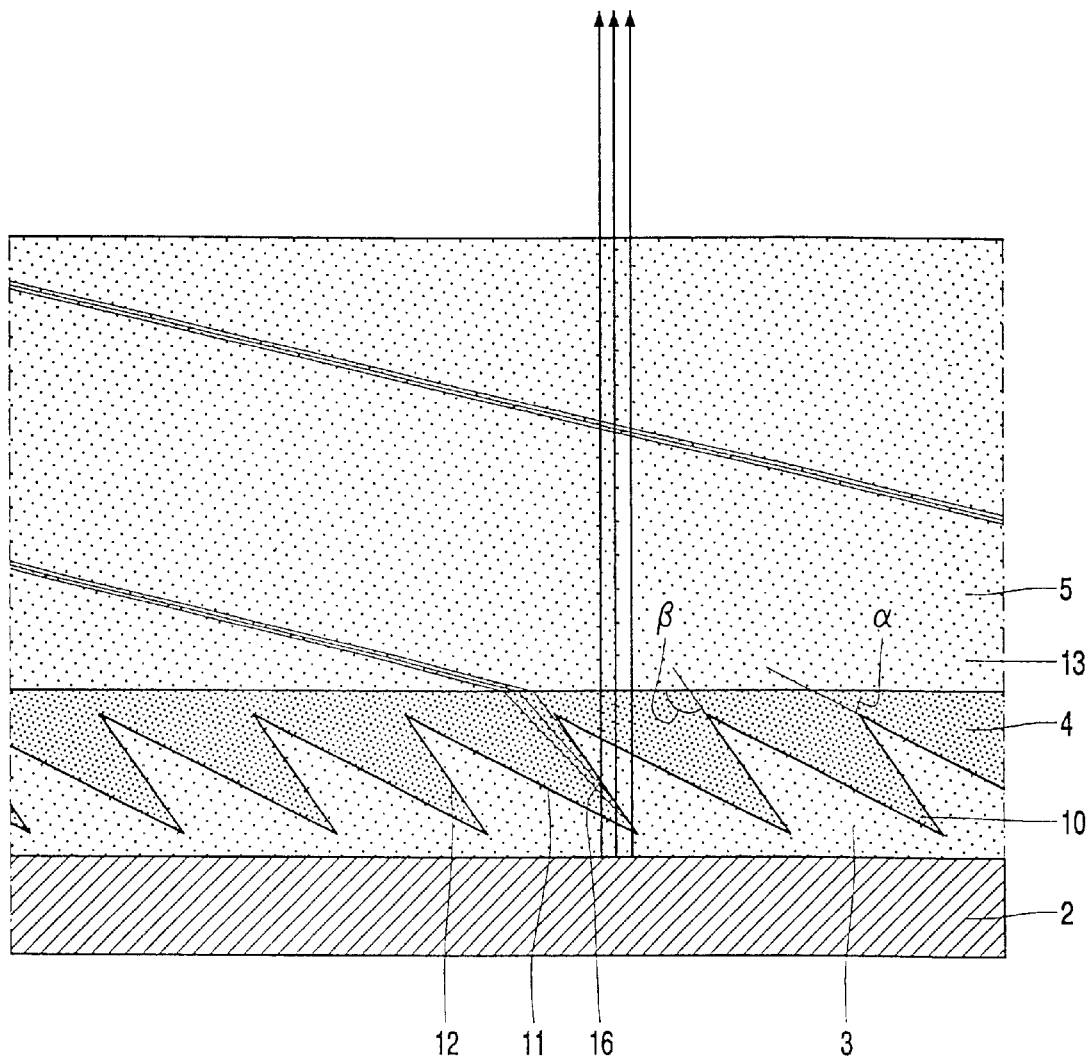
Figure 3:
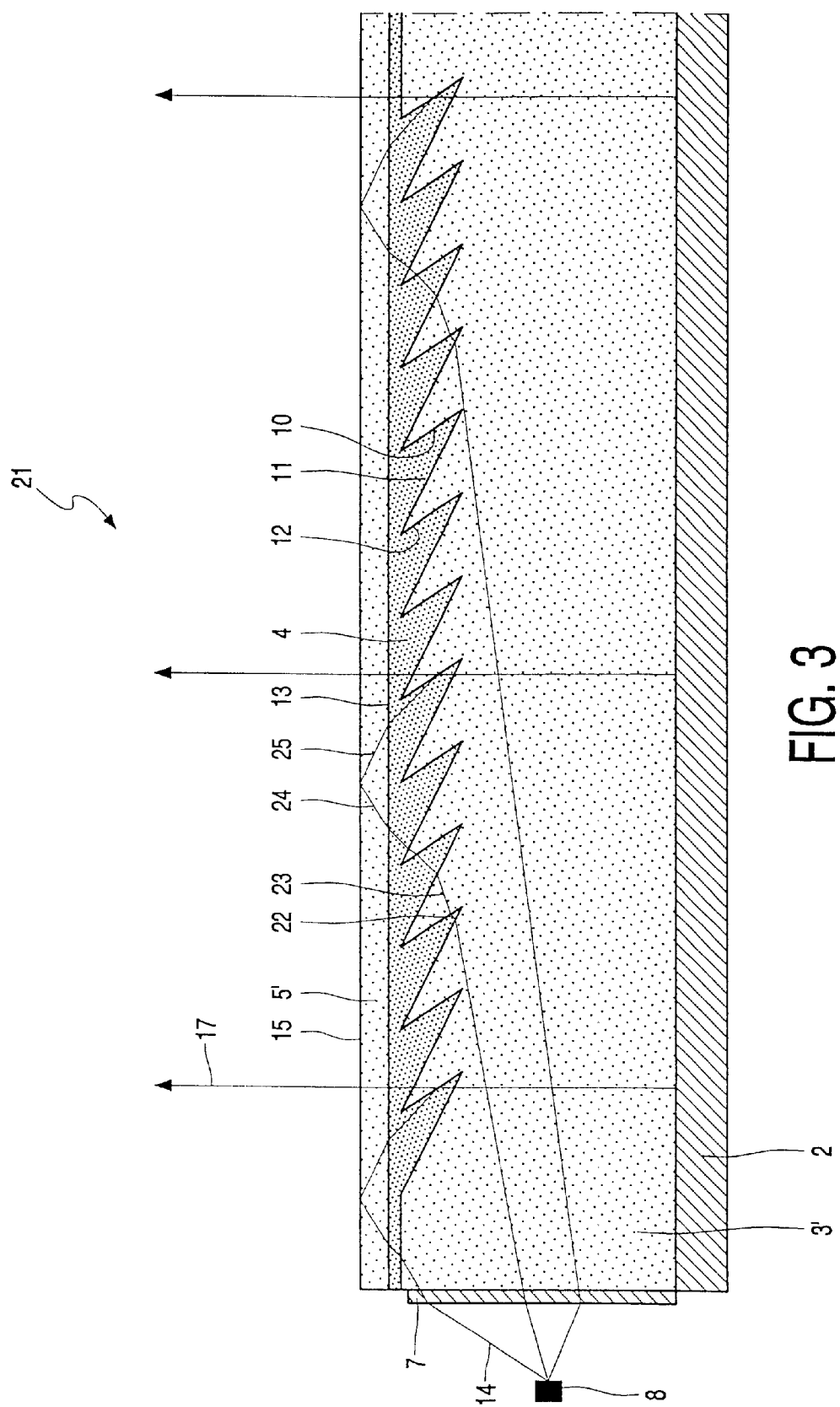
Figure 4:
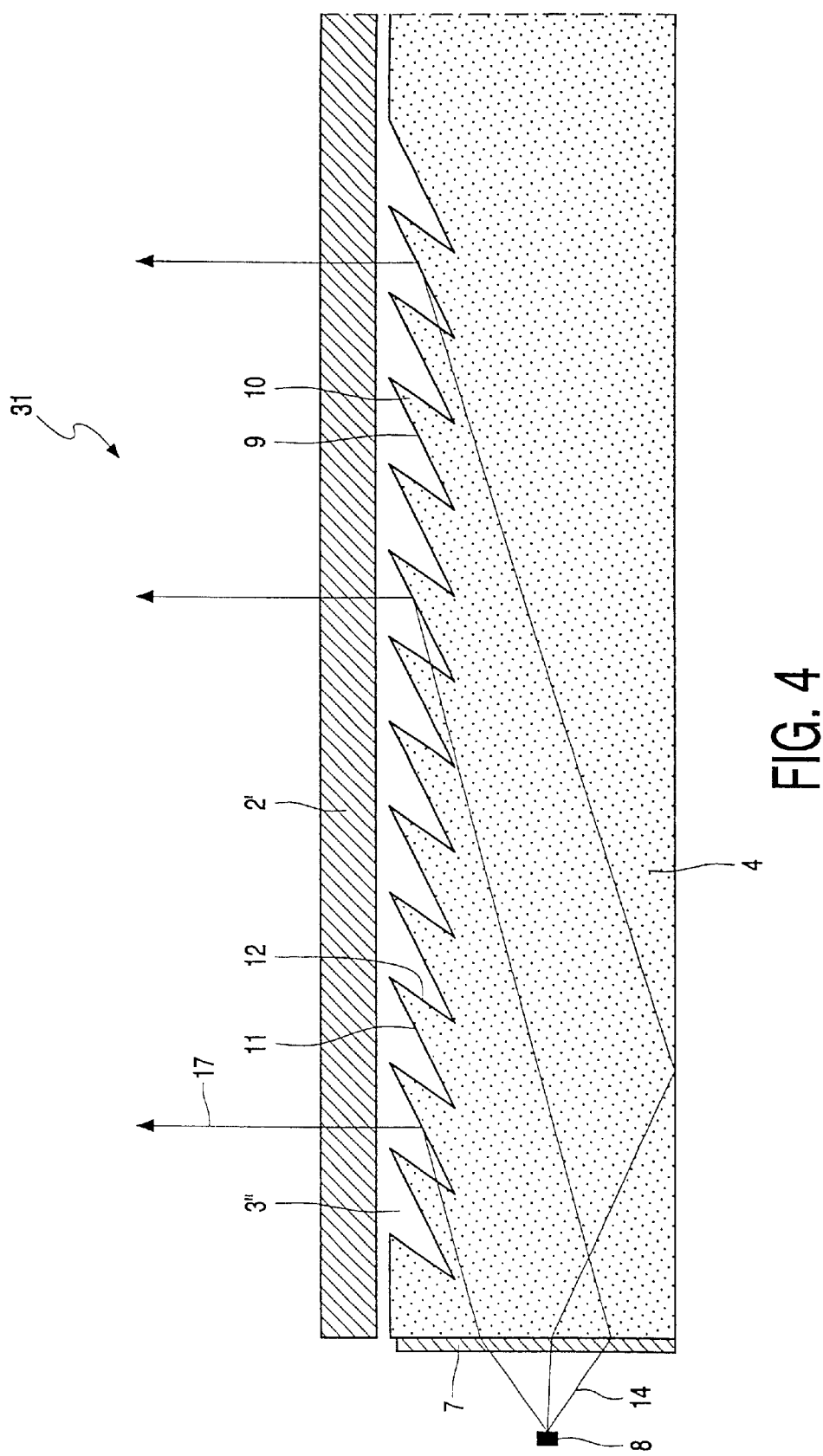

In the drawings:

FIG. 1 shows a first embodiment of an image display device according to the invention, FIG. 2 is an enlarged part II of the image display device shown in FIG. 1, FIG. 3 shows a second embodiment of an image display device according to the invention, FIG. 4 shows a third embodiment of an image display device according to the invention.

In the Figures, corresponding components are denoted by the same reference numerals.

FIG. 1 shows an image display device 1 according to the invention, comprising a light modulation panel 2 such as, for example, an LCD.

The image display device 1 is further provided with an intermediate layer 3 connected to the light modulation panel 2, a separating layer 4 connected to the intermediate layer 3 and a light-conducting layer 5 connected to the separating layer 4. An end face 6 of the conducting layer 5 is provided with a diffusion layer 7. The image display device further comprises a light source 8 situated on a side of the diffusion layer 7 remote from the light-conducting layer 5. The light source 8 is, for example, a light-emitting diode (LED) which emits light of a desired color such as, for example, white, red, green or blue. Coupling-in light in a light-conducting layer 5 in such a way is known per se and will therefore not be further explained.

The intermediate layer 3 and the separating layer 4 are separated from each other by a serrated surface 9. Due to the serrated surface 9, the separating layer 4 has a plurality of juxtaposed projections 10. Each projection 10 is bounded by a first and a second separating surface 11, 12. The separating layer 4 is provided with a flat surface 13 on the side remote from the serrated surface. The first separating surface 11 encloses an acute interior angle α (see FIG. 2) with the flat surface 13. The second separating surface 12 encloses an obtuse interior angle β (see FIG. 2) with the flat surface 13.

Due to the acute interior angle α and the obtuse interior angle β, the projections 10 are peak-shaped and one projection 10 extends partly beyond the juxtaposed projection 10. The projections 10 extend in a direction away from the light source 8.

The separating layer 4 is made of a material having two refractive indices $n_1$, $n_2$, in which it holds that $n_1$ is larger than $n_2$. The material may be, for example, a polymer with $n_1=1.76$ and $n_2=1.5$.

The intermediate layer is made of a material having a refractive index which substantially corresponds and is preferably equal to the refractive index $n_2$. The material may be, for example, PMMA with a refractive index $n_2$ of 1.5. The light-conducting layer 5 is made of a material having a refractive index which corresponds and is preferably equal to the refractive index $n_2$. The material of the light-conducting layer 5 is, for example, glass or also PMMA with a refractive index $n_2$ of 1.5.

The operation of the image display device 1 according to the invention will now be further explained.

The light source 8 emits light beams 14 having a first direction of polarization. The first refractive index $n_1$ applies to the light beams 14 having the first direction of polarization. These light beams 14 are equally spread in the light-conducting layer 5 by the diffusion layer 7. Each light beam 14 subsequently reaches the flat surface 13, possibly after reflection on the exit face 15 of the light-conducting layer 5. At the interface between the light-conducting layer 5 and the separating layer 4, the light beams 14 are deflected towards the light modulation panel 2 due to the transition between material having a low refractive index $n_2$ to material having a higher refractive index $n_1$. This is shown as light beam 16. The light beam 16 subsequently reaches the separating surface 12. The surface 12 is arranged at an angle β which is chosen to be such that a total reflection of the light beam 16 takes place on the surface 12. Such a total reflection occurs if $$90° < \beta < 180° - a\sin\left(\frac{n_2}{n_1}\right)$$

Due to this total reflection, the light beam 16 is further deflected towards the light modulation panel 2 and will reach the light modulation panel 2 in a substantially transverse direction. The light is modulated by the light modulation panel 2 and its direction of polarization is reversed. Refractive index $n_2$ applies to the light beam 17 thus modulated and polarization reversed. This means that, both for the separating surfaces 11, 12 and the flat surface 13, there is no change of the refractive index so that the light beam 17 is not deflected. If the light beam is incident substantially transversely (perpendicularly) to the light modulation panel, it will leave the exit face 15 of the light-conducting layer 5 in a direction substantially transverse to the light modulation panel 2.

The acute interior angle α of the first separating surface 11 is preferably chosen to be such that the angle α corresponds to the angles at which the light beams 16 enter the separating layer 4. Preferably, it holds that α=270°−2β. At such an angle α, all of the light from the light source 8 reaches one of the separating surfaces 12 so that there is no shadow effect.

FIG. 3 shows a second embodiment of an image display device 21 according to the invention, in which the light is coupled into the intermediate layer 3 instead of into the light-conducting layer 5. In the image display device 21, the intermediate layer 3' is therefore thicker and the conducting layer 5' may consequently be thinner than in the display device 1 shown in FIG. 1. The separating layer 4 is identical in both image display devices 1, 21.

The image display device 21 operates as follows. Light beams 14 coming from the light source 8 are deflected as light beam 22 towards the exit face 15 at the transition between the material of the intermediate layer 3' and the projections 10 of the separating layer 4. At the interface between the projection 10 and the intermediate layer 3', the light beam 22 is deflected in a direction remote from the exit face 15. Subsequently, the light beam 22 is deflected as light beam 23 near the separating face 12 in a direction facing the exit face 15. Such refractions occur several times until the light beam has reached the flat surface 13 and is deflected as light beam 24 in the direction of the exit face 15. Total reflection occurs on the surface 15 and light beam 24 is deflected as light beam 25 in the direction of the flat surface 13. This light beam 25 reaches the separating layer 4 on the second separating surface 12 where a total reflection in the direction of light modulation panel 2 takes place due to the combination described above of the angle β and the refractive indices $n_1$ and $n_2$. Subsequently, the light beam is modulated and the direction of polarization is reversed in the same manner as described with reference to the image display device 1. The light beam 17 thus modulated and polarization reversed leaves the exit face 15 in a direction substantially transverse to the light modulation panel 2.

FIG. 4 shows a further embodiment of an image display device 31 according to the invention, comprising a separating layer 4 in which the light is coupled into the separating layer 4 itself instead of into the light-conducting layer 5 or the intermediate layer 3. In the image display device 31 according to the invention, the intermediate layer 3 is formed by a layer of air. The light modulation panel 2' is situated on a side of the intermediate layer 3" remote from the separating layer 4. The light modulation panel 2' in the image display device 31 shown in FIG. 4 is a transmissive light modulation panel, which means that the light coming from one side leaves the light modulation panel 2' in a modulated form on another side. It is also possible to first provide a cover plate instead of the light modulation panel 2', which cover plate has the same refractive index as the separating layer 4.

The light source may also emit unpolarized light.

It is also possible to use a DMD as a light modulation panel. In this case, an ¼λ foil is to be provided between the DMD and the illumination device.

What is claimed is:

1. An image display device comprising
a light modulation panel,
an illumination device facing the light modulation panel and
a light source coupled to the illumination device,
said illumination device comprising
at least one separating layer which has at least one flat surface extending parallel to the light modulation panel and
a serrated surface situated on a side remote from the flat surface,
said serrated surface having a plurality of sawtooth-shaped, juxtaposed projections which are each bounded by a first and a second separating surface,
characterized in that
the first separating surface encloses an acute interior angle with the flat surface,
whereas the second separating surface encloses an obtuse interior angle with the flat surface.

2. An image display device as claimed in claim 1, characterized in that
   the separating layer has a first and a second refractive index,
   the first refractive index applying at least in the separating layer to the light beam from the light source and
   the second refractive index applying to the light beam modulated by the light modulation panel.

3. An image display device as claimed in claim 2, characterized in that
   the first refractive index is larger than the second refractive index.

4. An image display device as claimed in claim 2 or 3, characterized in that
   the flat surface is situated on a side remote from the light modulation panel,
   while a light-conducting layer is
      situated opposite the flat surface and
      has a refractive index which substantially corresponds to the second refractive index.

5. An image display device as claimed in claim 4, characterized in that
   the light source is coupled to the light-conducting layer.

6. An image display device as claimed in claim 2, characterized in that
   the serrated surface is situated on a side facing the light modulation panel,
   while an intermediate layer having a refractive index which substantially correspond to the second refractive index is situated between the serrated surface and the light modulation panel.

7. An image display device as claimed in claim 6, characterized in that
   the light source is coupled to the intermediate layer.

8. An image display device as claimed in claim 1, characterized in that
   the acute interior angle of the first serrated surface is substantially equal to an angle at which light beams from the light source enter the separating layer.

9. An image display device as claimed in claim 1, characterized in that
   a light beam coming from the light source and being incident on the second separating surface is substantially completely deflected toward the light modulation panel.

10. An image display device as claimed in claim 3, characterized in that
    the serrated surface is situated on a side facing the light modulation panel,
    while an intermediate layer having a refractive index which substantially correspond to the second refractive index is situated between the serrated surface and the light modulation panel.

11. An image display device as claimed in claim 4, characterized in that
    the serrated surface is situated on a side facing the light modulation panel,
    while an intermediate layer having a refractive index which substantially correspond to the second refractive index is situated between the serrated surface and the light modulation panel.

12. An image display device as claimed in claim 2, characterized in that
    the acute interior angle of the first serrated surface is substantially equal to an angle at which light beams from the light source enter the separating layer.

13. An image display device as claimed in claim 3, characterized in that
    the acute interior angle of the first serrated surface is substantially equal to an angle at which light beams from the light source enter the separating layer.

14. An image display device as claimed in claim 10, characterized in that
    the acute interior angle of the first serrated surface is substantially equal to an angle at which light beams from the light source enter the separating layer.

15. An image display device as claimed in claim 2, characterized in that
    a light beam coming from the light source and being incident on the second separating surface is substantially completely deflected toward the light modulation panel.

16. An image display device as claimed in claim 3, characterized in that
    a light beam coming from the light source and being incident on the second separating surface is substantially completely deflected toward the light modulation panel.

17. An image display device as claimed in claim 14, characterized in that
    a light beam coming from the light source and being incident on the second separating surface is substantially completely deflected toward the light modulation panel.

* * * * *